(12) United States Patent
Dahlberg et al.

(10) Patent No.: US 7,261,823 B2
(45) Date of Patent: Aug. 28, 2007

(54) ULTRASONIC TRANSDUCER SYSTEM

(75) Inventors: Hakan Dahlberg, Uppsala (SE); Heikki Sojakka, Markaryd (SE)

(73) Assignee: Ultra Technology Europe AB, Vaxjo (SE)

( * ) Notice: Subject to any disclaimer, the term of this patent is extended or adjusted under 35 U.S.C. 154(b) by 41 days.

(21) Appl. No.: 10/897,490

(22) Filed: Jul. 23, 2004

(65) Prior Publication Data
US 2005/0000914 A1 Jan. 6, 2005

Related U.S. Application Data

(63) Continuation-in-part of application No. 10/451,962, filed on Jun. 27, 2003, now Pat. No. 7,147,755.

(51) Int. Cl.
*B01D 33/04* (2006.01)
*B01D 33/54* (2006.01)

(52) U.S. Cl. .................. 210/783; 210/785; 162/209

(58) Field of Classification Search ............. 210/748, 210/750, 160, 167, 783, 384, 386, 401, 402, 210/785, 400, 780; 162/192, 209, 229
See application file for complete search history.

(56) References Cited

U.S. PATENT DOCUMENTS

| | | | | |
|---|---|---|---|---|
| 4,346,011 A | * | 8/1982 | Brownstein | 210/748 |
| 5,858,104 A | * | 1/1999 | Clark | 134/1 |
| 6,016,023 A | * | 1/2000 | Nilsson et al. | 310/341 |
| 6,224,826 B1 | * | 5/2001 | Katakura et al. | 422/20 |
| 6,652,733 B2 | * | 11/2003 | Napper | 205/335 |
| 2002/0050328 A1 | * | 5/2002 | Hakansson et al. | 162/209 |

FOREIGN PATENT DOCUMENTS

| | | | |
|---|---|---|---|
| DE | 19939514 A1 | * | 2/2001 |
| SU | 1587097 A | * | 8/1990 |
| WO | WO95/28521 | * | 10/1995 |

* cited by examiner

*Primary Examiner*—Matthew O. Savage
(74) *Attorney, Agent, or Firm*—Rolf Fasth; Fasth Law Offices

(57) ABSTRACT

The method is for treating a liquid or slurry with an ultrasonic energy. A first rotatable member being permeable to a medium and a first vibrating device are provided. The first vibrating device and the first member have a first gap formed therebetween so that the first gap represents a first distance. A guide member aligned with the first member exerts a pressure on the medium. The guide member breaks up fiber flocculation close to the upper surface of the medium. The medium is fed between the first member and the guide member. The first vibrating device generates pulses through the first member to form imploding bubbles in the medium. The bubbles have a critical diameter prior to implosion that is greater than the first distance to prevent the bubbles from growing in the first gap to a size greater than the first distance.

11 Claims, 20 Drawing Sheets

ULTRASONIC TRANSDUCER SYSTEM

PRIOR APPLICATION

This is a continuation-in-part application of U.S. patent application Ser. No. 10/451,962, filed 27 Jun. 2003, now U.S. Pat. No. 7,147,755, that claims priority from PCT application no. PCT/SE02/02195 filed 28 Nov. 2002 that claims priority from U.S. provisional patent application Ser. No. 60/339,380, filed 11 Dec. 2001.

TECHNICAL FIELD

The present invention is an ultrasonic transducer system with a guiding device in operative engagement therewith. More particularly, the transducer system may be used on moving endless members that are permeable to liquid and the guiding device is in contact with the medium on the moving endless members.

BACKGROUND AND SUMMARY OF INVENTION

Ultrasonic energy has been applied to liquids in the past. Sufficiently intense ultrasonic energy applied to a liquid, such as water, produces cavitation that can induce changes in the physiochemical characteristics of the liquid. The subject of sonochemistry, which deals with phenomena of that sort, has grown very much during recent years.

Most of the published material in sonochemistry and related subjects pertains to batch processes, that is, the liquid solution or dispersion to be treated is placed in a container. The liquid in the container is then stirred or otherwise agitated, and ultrasound is applied thereto. It is then necessary to wait until the desired result, physical or chemical change in the liquid, is achieved, or until no improvement in the yield is observed. Then the ultrasound is turned off and the liquid extracted. In this way liquid does not return to its initial state prior to the treatment with ultrasonic energy. In this respect, the ultrasound treatment is regarded as irreversible or only very slowly reversible.

Far from all industrial processes using liquids are appropriately carried out in batches, as described above. In fact, almost all large-scale processes are based upon continuous processing. The reasons for treating liquids in continuous processes are many. For example, the fact that a given process may not be irreversible, or only slowly reversible, and requires that the liquid be immediately treated further before it can revert to its previous state.

Shock waves external to collapsing bubbles driven onto violent oscillation by ultrasound are necessary for most if not all physiochemical work in liquid solutions. The under-pressure pulses form the bubbles and the pressure pulses compress the bubbles and consequently reduce the bubble diameter. After sufficient number of cycles, the bubble diameter is increased up to the point where the bubble has reached its critical diameter whereupon the bubble is driven to a violent oscillation and collapses whereby a pressure and temperature pulse is generated. A very strong ultrasound field is forming more bubbles, and drives them into violent oscillation and collapse much quicker.

A bubble that is generated within a liquid in motion occupies a volume within said liquid, and will follow the speed of flow within said liquid. The weaker ultrasound field it is exposed to, the more pulses it will have to be exposed to in order to come to a violent implosion. This means that the greater the speed of flow is, the stronger the ultrasound field will have to be in order to bring the bubbles to violent implosion and collapse. Otherwise, the bubbles will leave the ultrasound field before they are brought to implosion. A strong ultrasound field requires the field to be generated by very powerful ultrasound transducers, and that the energy these transducers generate is transmitted into the liquid to be treated. Based upon this requirement, Bo Nilsson and Hakan Dahlberg started a development of new types of piezoelectric transducer that could be driven at voltages up to 13 kV, and therefore capable of generating very strong ultrasonic fields.

A very strong ultrasonic source will cause a cushion of bubbles near the emitting surface. The ultrasound cannot penetrate through this cushion, and consequently no ultrasound can penetrate into the medium to be treated. The traditional way to overcome this problem is to reduce the power in terms of watts per unit area of emitting surface applied to the ultrasonic transducers. As indicated above, the flow speed of the medium to be treated will require a stronger ultrasound field and therefore an increased power applied to the ultrasonic transducers. The higher the power input is, the quicker the cushion is formed, and the thicker the formed cushion will be. A thick cushion will completely stop all ultrasound penetration into a liquid located on the other side of this cushion. All the cavitation bubbles in this cushion will then stay in the cushion and cause severe cavitation damage to the ultrasound transducer assembly area leading to a necessary exchange of that part of the ultrasound system. This means that little or no useful ultrasound effect is achieved within the substrate to be treated, and that the ultrasound equipment may be severely damaged. There is a need to solve the problems outline above. The transducer systems of the present invention provide a solution to the problems.

More particularly, the method is for treating a liquid or slurry with an ultrasonic energy. A first rotatable member being permeable to a medium and a first vibrating device are provided. The first vibrating device and the first member have a first gap formed therebetween so that the first gap represents a first distance. A guide member aligned with the first member exerts a pressure on the medium. The guide member breaks up fiber flocculation close to the upper surface of the medium. The medium is fed between the first member and the guide member. The first vibrating device generates pulses through the first member to form imploding bubbles in the medium. The bubbles have a critical diameter prior to implosion that is large enough to prevent the bubbles from growing in the first gap to a size greater than the first distance.

DETAILED DESCRIPTION

Figure 1:
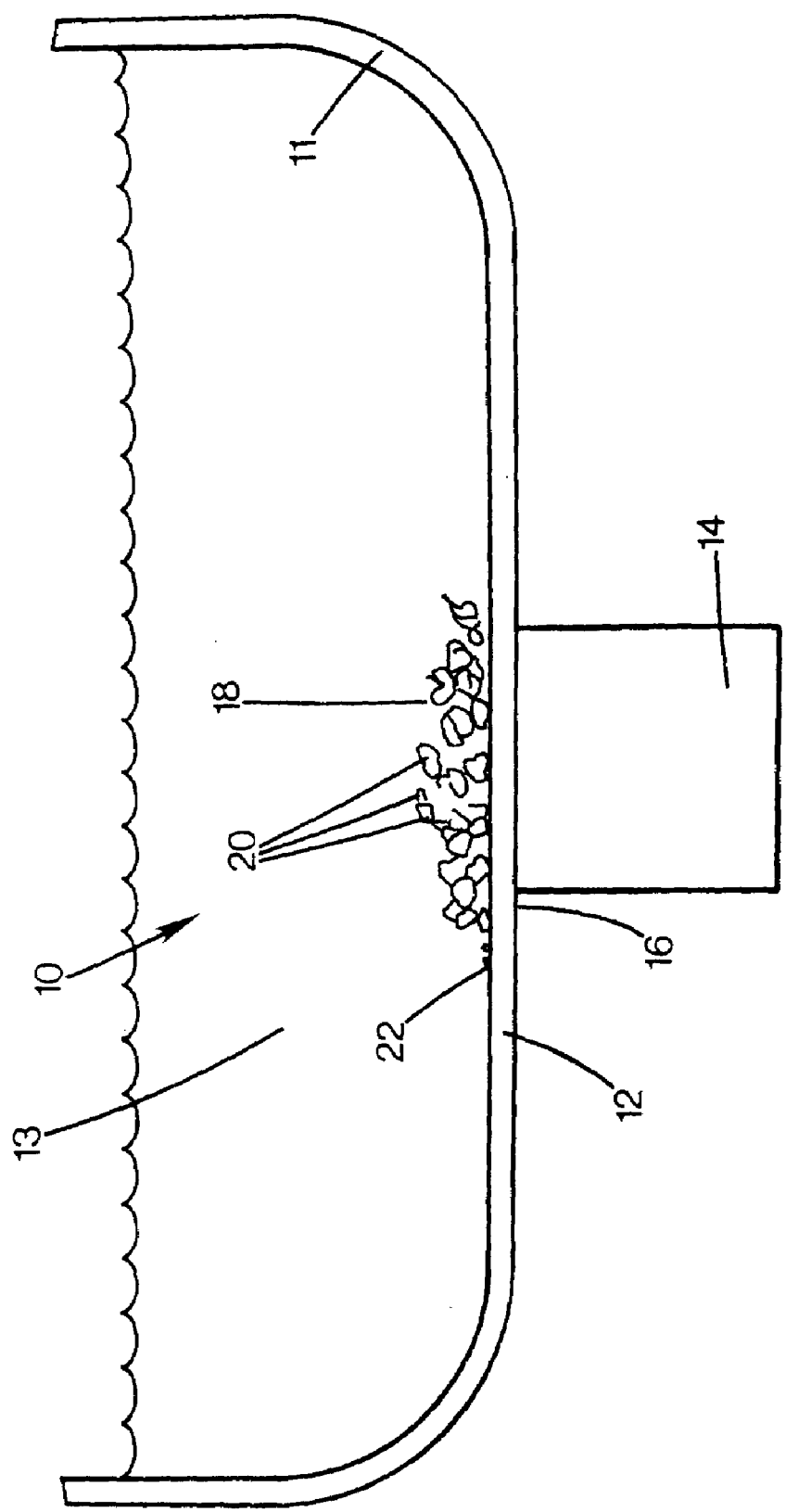
FIG. 1 is a schematic side view of the formation of a reactor of a prior art system.

FIG. 1 is a side view of a prior art transducer system 10 that has a container 11, such as a stainless reactor, with a wall 12 for containing a liquid 13. A transducer 14 is attached to an outside 16 of the wall 12. When the transducer 14 is activated, a pillow 18 of cavitation bubbles 20 are formed on an inside 22 of the wall 12 due to the fracture zone in the liquid 13 that may be a result of fracture impressions on the inside 22 of the wall 12. The bubbles may be held to the inside wall due to the surface tension of the liquid 13. The bubbles 20 are good insulators and prevent the effective transmission of the ultrasonic energy into the liquid 13. The under-pressure pulses of the ultrasonic energy transmitted by the transducer 14 create the cavitation bubbles. In this way, the pressure inside the bubbles is very low.

Figure 2:
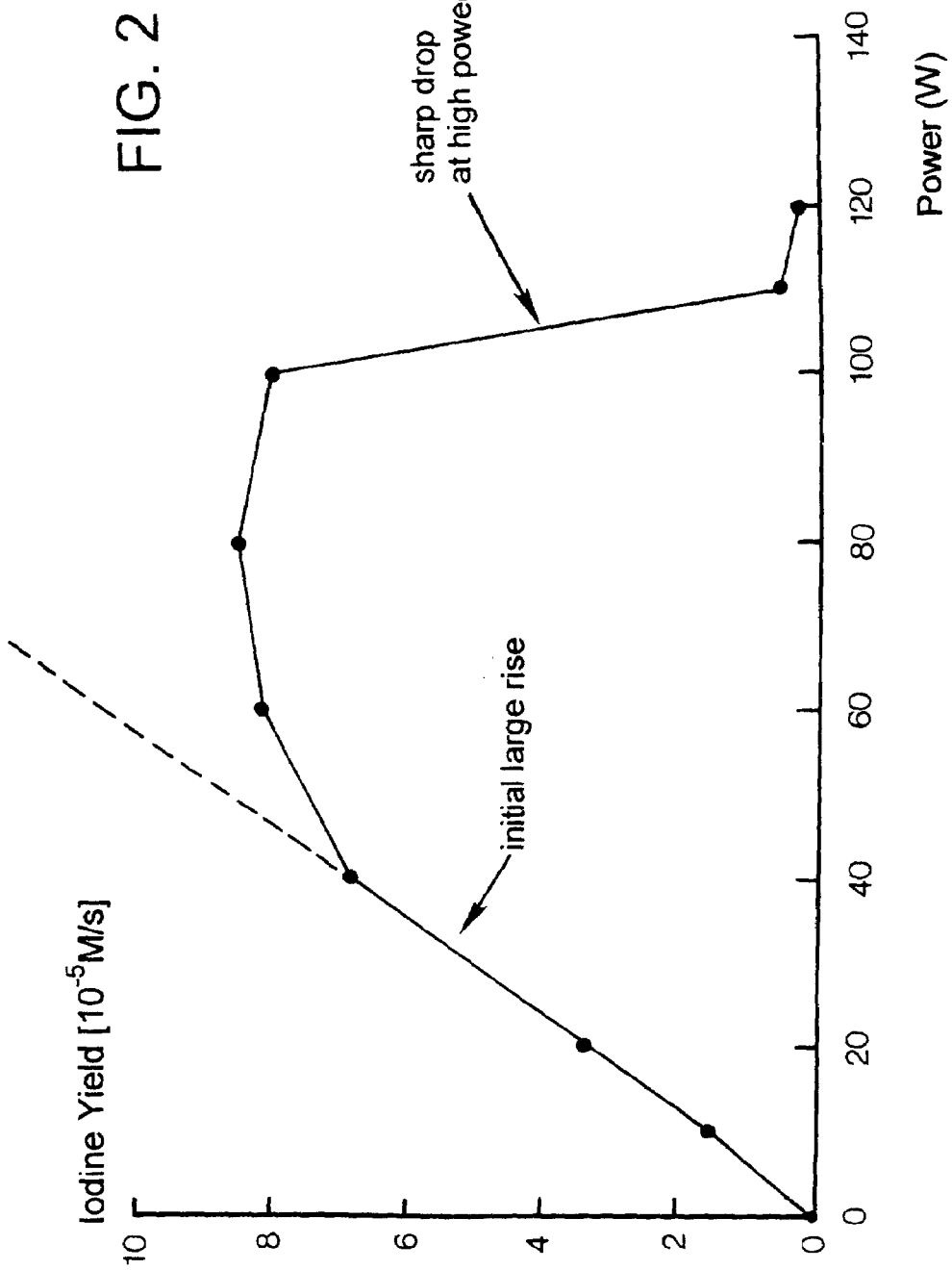
FIG. 2 is a graphical illustration of the correlation between iodine yield and acoustic power.

FIG. 2 is a graphical illustration that shows the iodine yield is affected by increased acoustic power on the system 10. The more power is applied, the thicker the formation of the bubbles 20, as shown in FIG. 1, and the yield increase is reduced and drops sharply at power ratings over 100 Watts in this case. In this way, the cavitation bubbles severely limit the usefulness of increasing the acoustic power to improve the iodine yield.

Figure 3:
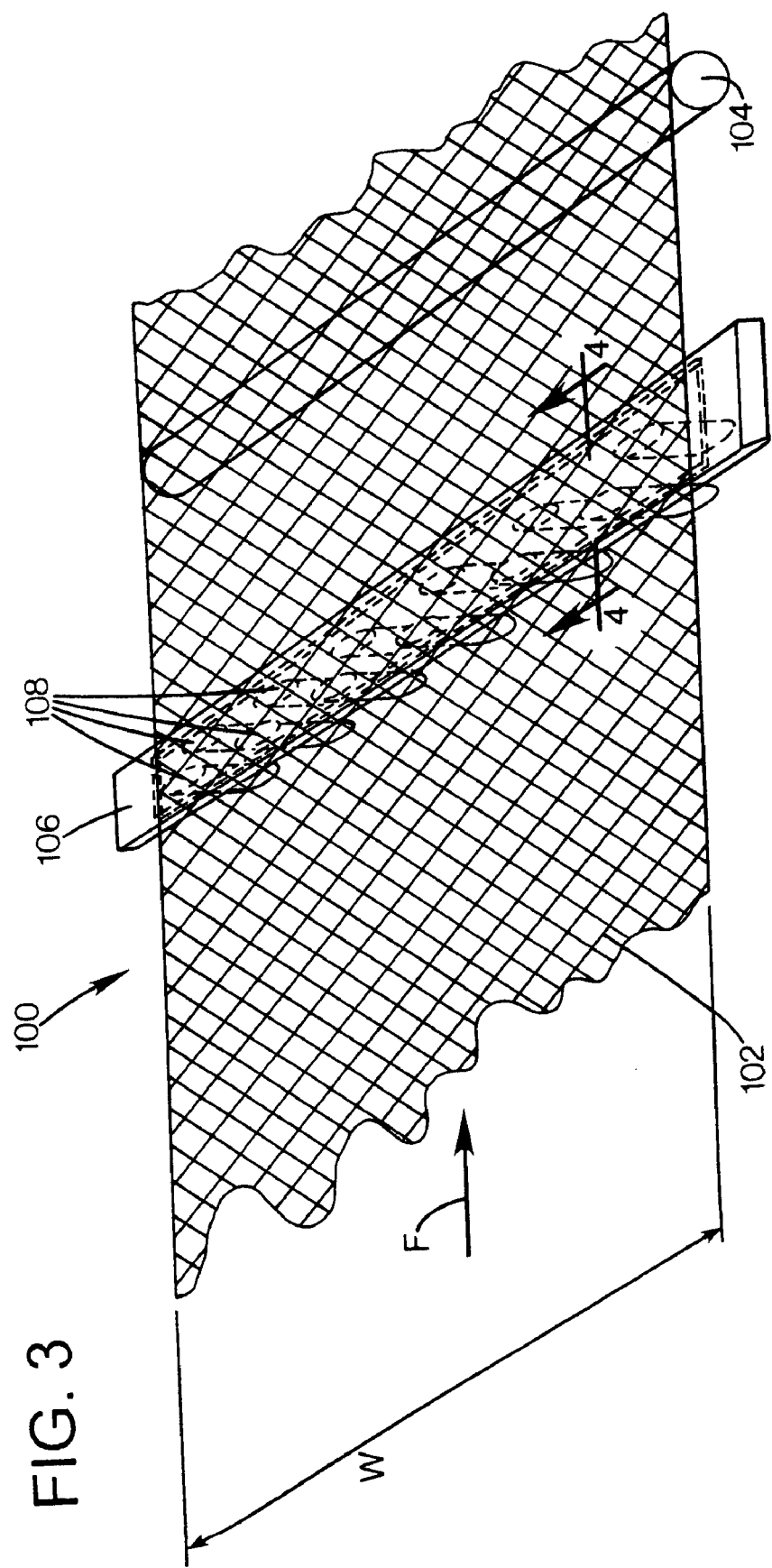
FIG. 3 is a perspective view of the transducer system of the present invention disposed below a movable endless member.
Figure 5A:
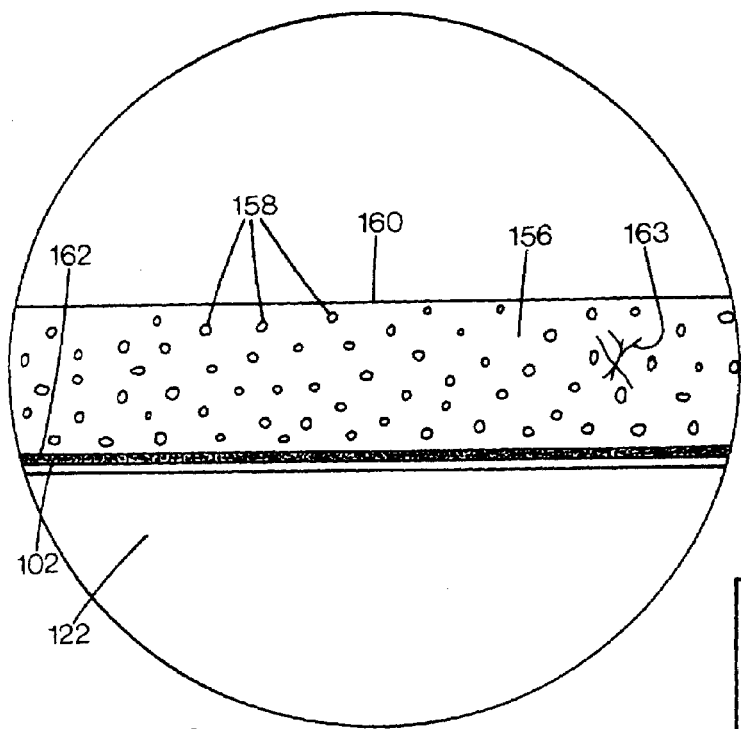
FIG. 5A is an enlarged view of the cavitation bubbles dispersed in slurry disposed above the movable endless medium, indicated with dashed lines as 5A in FIG. 5.
Figure 5B:
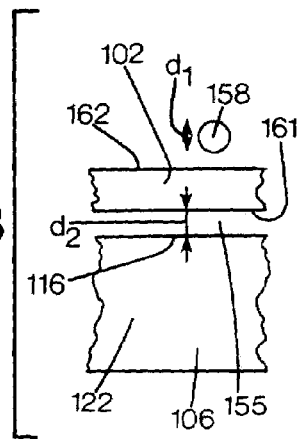
FIG. 5B is an enlarged view of a portion of the movable endless permeable member and the elongate foil.

FIG. 3 is a perspective view of the transducer system 100 of the present invention. The system has a movable endless permeable member 102, such as a woven material, paper machine plastic wire or any other bendable medium permeable to liquids, that is rotatable about rollers 104 that guide the member 102 in an endless path. As explained below, it is important that the member is permeable to a liquid that may carry ultrasonic energy to the liquid disposed above the member 102 so as to effectively create the cavitation bubbles in the liquid or slurry to be treated. The ultrasonic energy may be used to reduce flocculation 163, best shown in FIG. 5A, of fibers in the liquid to be treated because the bubbles implode or collapse to generate pressure pulses to the fiber flocculation 163 so that the fibers are separated from one another to evenly distribute or disperse the fibers in the liquid. The pressure pulses may be about 500 bars so the pulses are more forceful than the forces that keep the fiber flocculation together. In general, the longer the fibers or the higher the fiber consistency is the higher the tendency of flocculation.

The member may have a speed up to 2000 meters per minute in the machine direction (MD) as shown by an arrow (F). An elongate foil 106, made of, for example, steel or titanium is disposed below the permeable member 102 and extends across a width (W) of the member 102. A plurality of transducers 108, such as magneto-strictive, piezoelectric or any other suitable type of transducers, is in operative engagement with the foil 106 such as by being integrated therewith or attached thereto. All transducers mentioned below are preferably ultrasound transducers although that is often not mentioned.

Figure 4:
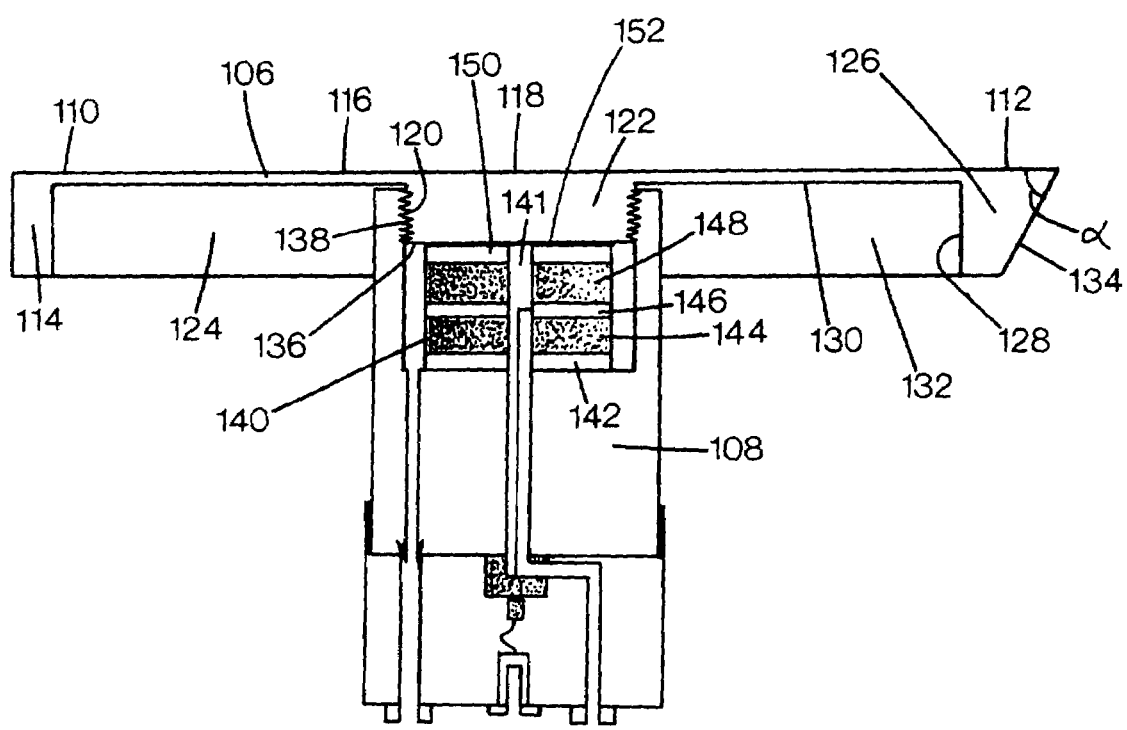
FIG. 4 is a cross-sectional view along line 4—4 in FIG. 3.

FIG. 4 is a detailed view of one of the transducers 108 attached to a mid-portion 118 of the hydrodynamic foil 106. More particularly, the foil 106 has a rear portion 110 and a front portion 112. The rear portion 110 has a rectangular extension 114 that extends away from a top surface 116 of the foil 106. The mid-portion 118 of the foil 106 has a threaded outside 120 of a connecting member 122 also extending away from the top surface 116 so that a cavity 124 is formed between the extension 114 and the connecting member 122.

The front portion 112 has an extension 126 that extends away from the top surface 116 and has a back wall 128 that is perpendicular to a bottom surface 130 of the foil 106 so that a cavity 132 is formed between the back wall 128 and the member 122. The extension 126 has a front wall 134 that forms an acute angle alpha with the top surface 116. The cavities 124 and 132 provide resonance to the ultrasound transmitted by the transducers 108 to reinforce the amplitude of the vibrations of the ultrasound. The front wall 134 forms an acute angle alpha with a top surface 116 of the foil 106 to minimize the pressure pulse when the water layer under the member is split by the front wall 134 so a larger part of the water is going down and only a minor part is going between the top side of the foil 116 and the member 102. When the member 102 is moving over the foil surface 116 a speed dependant under-pressure is created that will force down the member 102 against the foil surface 116. When the member is leaving the foil 106 there is room to urge the liquid 156 through the member 102.

In other words, the design of the extension 126 is particularly suitable for paper manufacturing that has slurry of water and fibers. The water layer split at the front wall 134 creates an under-pressure pulse so that the water on top of the moving medium flows through the member 102 and into a container there below. The design of the extension 126 may also be designed for other applications than paper making that is only used as an illustrative example.

The transducer 108 has a top cavity 136 with a threaded inside wall 138 for threadedly receiving the member 122. The transducer 108 may be attached to the foil 106 in other ways. For example adhesion or mechanical fasteners may attach the transducer and the present invention is not limited to the threaded connection described above.

Below the top cavity 136, a second housing cavity 140 is defined therein. The cavity 140 has a central segment 141 to hold a bottom cooling spacer 142, a lower piezoelectric element 144, a middle cooling spacer 146, an upper piezoelectric element 148 and a top cooling spacer 150 that bears against a bottom surface 152 of the connecting member 122. The spacers 142, 146, 150 are used to lead away the frictional heat that is created by the elements 144, 148.

By using three spacers, all the surfaces of the elements 144, 148 may be cooled. As the piezoelectric elements 144, 148 are activated, the thickness of the elements is changed in a pulsating manner and ultrasonic energy is transmitted to the member 122. For example, by using a power unit with alternating voltage of a level and frequency selected to suit the application at hand, the elements 144, 148 start to vibrate radially. In this way, if the AC frequency is 20 kHz then a sound at the same 20 kHz is transmitted. It is to be understood that any suitable transducer may be used to generate the ultrasonic energy and the invention is not limited to piezoelectric transducers.

Figure 5:
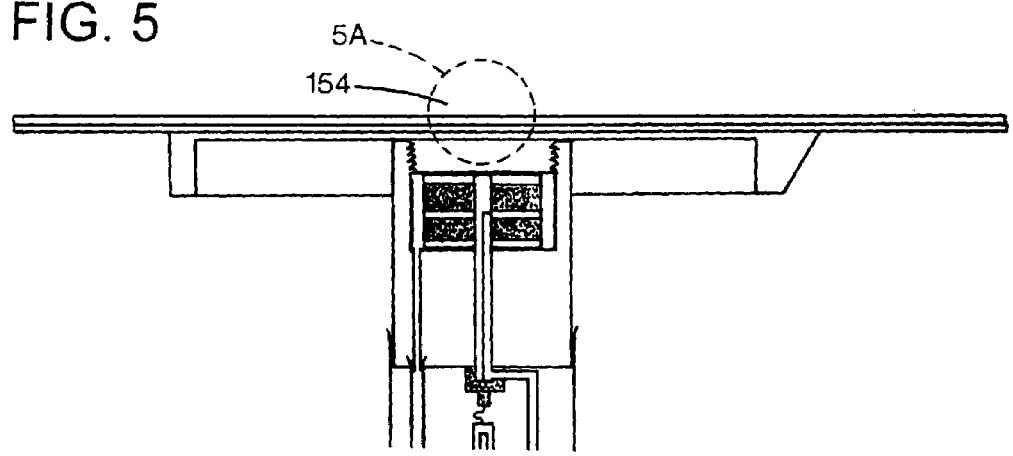
FIG. 5 is an enlarged view of a central segment of the movable endless permeable member, the elongate foil and the slurry.

FIG. 5 is an enlarged view of a central segment 154 so that the permeable member 102 bears or is pressed against the top surface 116 of the member 122 of the foil 106 so there is not sufficient space therebetween to capture cavitation bubbles. In other words, an important feature of the present invention is that a gap 155 defined between the foil 106 and the member 102 has is less than one half critical bubble diameter so that no bubbles of critical size can be captured therebetween. The gap 155 between the member 102 and the foil 106 is defined by the tension in the member 102, the in-going angle between the member 102 and the foil 106, the pressure pulse induced by the water layer split at the front of the foil 106, the geometry of the foil 106, the under-pressure pulse when the member 102 leave the foil 106 and the out-going angle of the member 102. The bubbles 158 have a diameter d1 that is at least twice as long as the distance d2 of the gap 155 between the top surface 116 of the foil 106 and the bottom surface 161 of the permeable member 102. In this way, the cavitation bubbles 158 are forced through the permeable member 102 to disperse into the liquid substance 156 that is subject to the ultrasonic treatment and disposed above the member 102. The liquid substance 156 has a top surface 160 so that the bubbles 158 are free to move between the top surface 160 of the substance 156 and a top surface 162 of the member 102. In general, the effect of the ultrasonic energy is reduced by the square of the distance because the liquid absorbs the energy. In this way, there are likely to be more cavitation bubbles formed close to the member 102 compared to the amount of bubbles formed at the surface 160. An important feature is that because the member 102 is moving and there is not enough room between the foil 106 and the member 102, no cavitation bubbles are captured therebetween or along the top surface 162 of the movable member 102.

Figure 6:
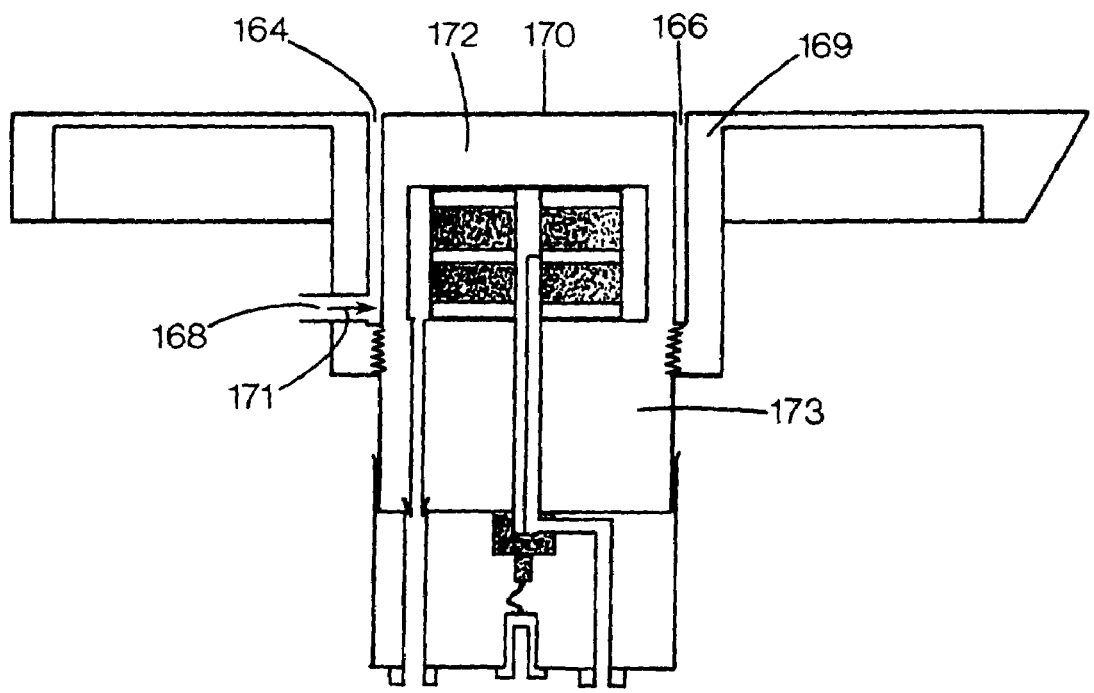
FIG. 6 is a cross-sectional view of a second embodiment of the transducer system of the present invention.

The second embodiment of a transducer system 173 shown in FIG. 6 is virtually identical to the embodiment shown in FIG. 4 except that the transducer system 173 has a first channel 164 and a second channel 166 defined therein that are in fluid communication with an inlet 168 defined in a foil member 169. The channels 164, 166 extend perpendicularly to a top surface 170 of a connecting member 172. The channels 164, 166 may extend along the foil 169 and may be used to inject water, containing chemicals, therethrough. For example, in papermaking, the chemicals may be bleaching or softening agents. Other substances such as foaming agents, surfactant or any other substance may be used depending upon the application at hand. The ultrasonic energy may be used to provide a high pressure and temperature that may be required to create a chemical reaction between the chemicals added and the medium. The channels 164, 166 may also be used to add regular water, when the slurry above the moving medium is too dry, so as to improve the transmission of the ultrasonic energy into the slurry. The chemicals or other liquids mentioned above may also be added via channels in the front part of the transducer assembly bar 106. If the liquid content of the medium to be treated is very low, the liquid may simply be applied by means of spray nozzles under the web. Also in those cases may the applied liquid be forced into the web by the ultrasonic energy and afterwards be exposed to sufficient ultrasound energy to cause the desired reaction to take place between the chemicals and the medium to be treated.

Figure 7:
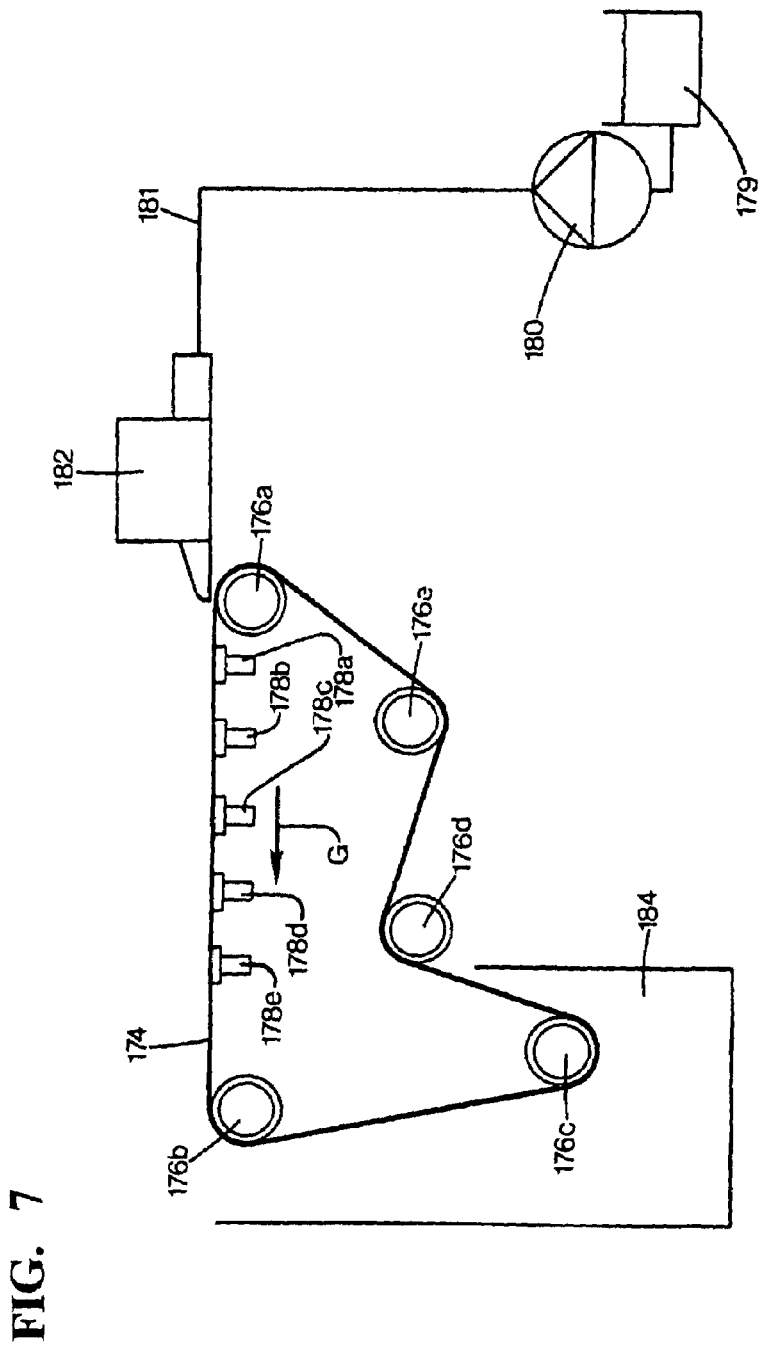
FIG. 7 is a cross-sectional view of a plurality of transducers disposed below a movable endless medium.

FIG. 7 is an overall side view showing an endless bendable permeable medium 174 that are supported by rollers 176a–e. Below the medium 174 is a plurality of transducer systems 178a–e for increased output by adding more ultrasonic energy to the system. By using a plurality of transducers, different chemicals may be added to the slurry 179, as required. The slurry 179 contains fibers or other solids, to be treated with ultrasonic energy, is pumped by a pump 180 in a conduit 181 via a distributor 182 onto the medium 174 that moves along an arrow (G). The treated fibers may fall into a container 184.

The transducer system of the present invention is very flexible because there is no formation of cavitation bubble pillows in the path of the ultrasonic energy. By using a plurality of transducers, it is possible to substantially increase the ultrasonic energy without running into the problem of excessive cavitation bubbles to block the ultrasound transmission. The plurality of transducers also makes it possible to add chemicals to the reactor in different places along the moving medium, as required.

Figure 8:
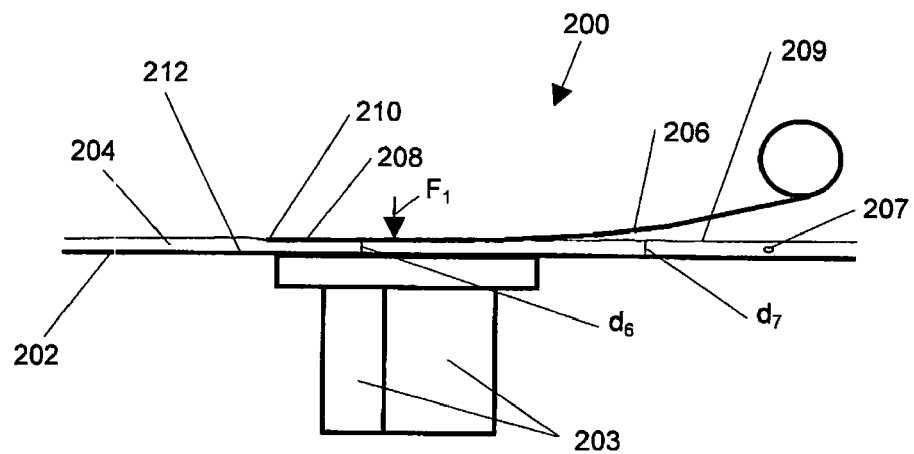
FIG. 8 is a schematic cross-sectional side view of transducer system and guiding member of the present invention.

FIG. 8 is a cross-sectional view of a transducer system 200 that has a movable endless permeable member 202 that may be identical to the member 102 above and may be made of a woven material, paper machine plastic wire or any other bendable medium permeable to liquids, that is rotatable about rollers that guide the medium in an endless path. As explained in detail above, it is important that the member is permeable to a liquid or other medium that may carry ultrasonic energy to a liquid or other medium 204 disposed above the member or wire 202 so as to effectively create the cavitation bubbles in the liquid or medium 204 to be treated. The ultrasonic energy may be used to reduce flocculation of fibers in the medium liquid to be treated because the bubbles implode or collapse to generate pressure pulses to the fiber flocculation so that the fibers are separated from one another to evenly distribute or disperse the fibers in the medium 204.

A guide member 206 is disposed above the medium 204 and exerts a downward pressure F1 on the stock medium 204 so that a distance d6 is formed between a bottom surface 208 at an outer end 210 of the guide member 206 and an upper surface 212 of the member 202. It is also possible for the guide member 206 to merely gently rest on the stock medium 204. Preferably, the distance d6 is less than a thickness d7 of the incoming medium 204 upstream of the position of the guide member 206. A transducer 203 is disposed below the member 202 to provide the ultrasonic energy that is described in detail above. An important feature of the guide member 206 is that it breaks up larger fiber flocculation 207 that may be disposed closer to the upper surface 209 of the stock medium 204. It is particularly useful for breaking up such flocculation that cannot be reached by the ultrasound generated by the transducer 203 that is located below the wire 202 and thus more affects fiber flocculation closer to the wire 202 than fiber flocculation that may be close to the surface 209. The use of the transducer improves the fiber formation with up to about 18% compared to using no transducer. The addition of the guide member 206 improves the fiber formation with up to about 28% compared to using no transducer or guide member when all values are measured as according to the Kajaani formation index. It is not possible to merely increase the power of the transducer 203 to reduce fiber flocculation close to the surface 209 because that could destroy the initial fiber network that already has been formed on the wire 202.

Figure 9:
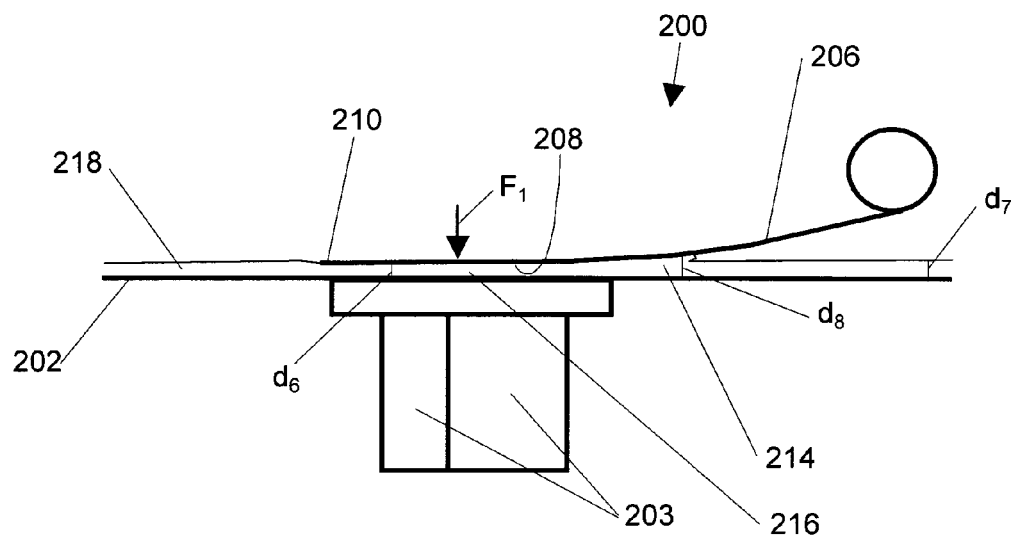
FIG. 9 is a schematic cross-sectional side view of transducer system and guiding member including a retardation zone of the present invention.

As best shown in FIG. 9, the pressure F1 on the medium creates a retardation zone 214 right behind the guide member 206 and an acceleration zone 216 below the guide member 206 since the thickness d7 of the medium 204 is reduced to the thickness d6. The retardation zone 214 may include an area of turbulence of the stock medium and has a thickness d8 that is greater than both the thickness d6 and d7. This means the medium 204 flows at a higher velocity in the zone 216 compared to the zone 214. The medium 204 is first exposed to acceleration in the zone 216 and then to retardation to the normal velocity in a normal zone 218 at or downstream of the outer end 210 of the guide member 206. The thickness of the medium 204 is returned to near the thickness d7 in the normal zone 218 since some liquid may have been drained through the member 202 during the passage of the transducer system 200. As explained below, there may also be another retardation zone downstream of the guide member. This increase and then slowdown in velocity exposes fiber flocculation to shear forces that break them up. Also, because the thickness d6 is less than the thickness d7, the fibers are closer to the transducer 203 in the acceleration zone 216 and are therefor exposed to higher ultrasonic energy to better break up flocculation without destroying the fiber network of the medium 204. By effectively breaking up fiber flocculation without destroying any previously formed fiber network, the fibers are more efficiently distributed for improved strength.

Figure 10:
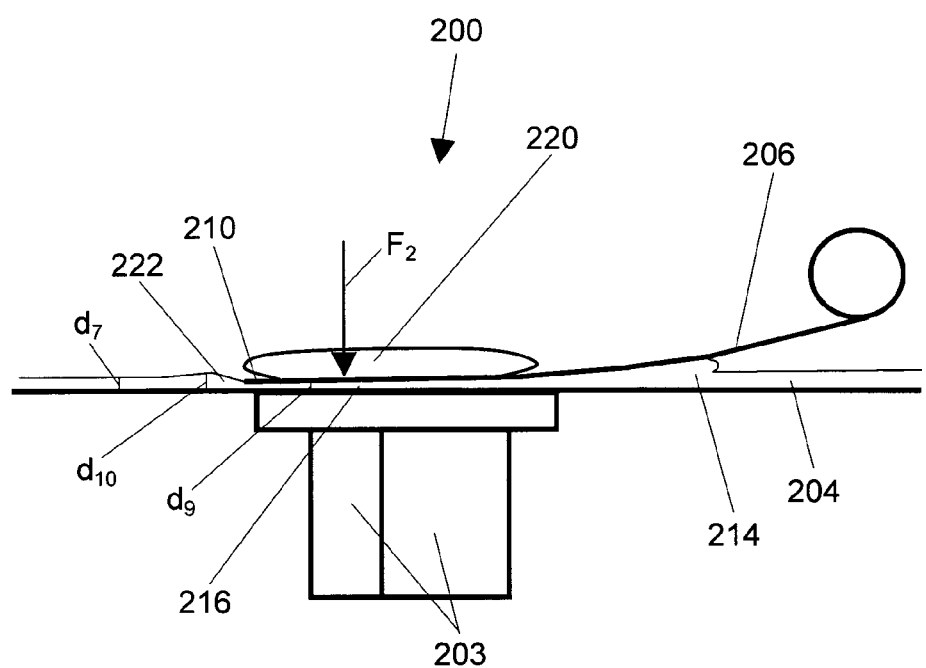
FIG. 10 is a schematic cross-sectional side view of transducer system and guiding member including a load member of the present invention.

FIG. 10 shows the system 200 with a weight 220 such as a liquid bag placed on the outer end 210 of the guide member 206 to increase the downward force to a force F2 that is greater than the force F1 and the thickness in the acceleration zone 216 is reduced from the thickness d6 to a smaller thickness d9. A retardation zone 222 with a thickness d10 may be formed downstream of the outer end 210 before the stock medium 204 returns to a normal thickness d7 or near d7. Because the thickness d9 is so thin the retardation zone 214 upstream of the guide member 206 is also greater.

Figure 11:
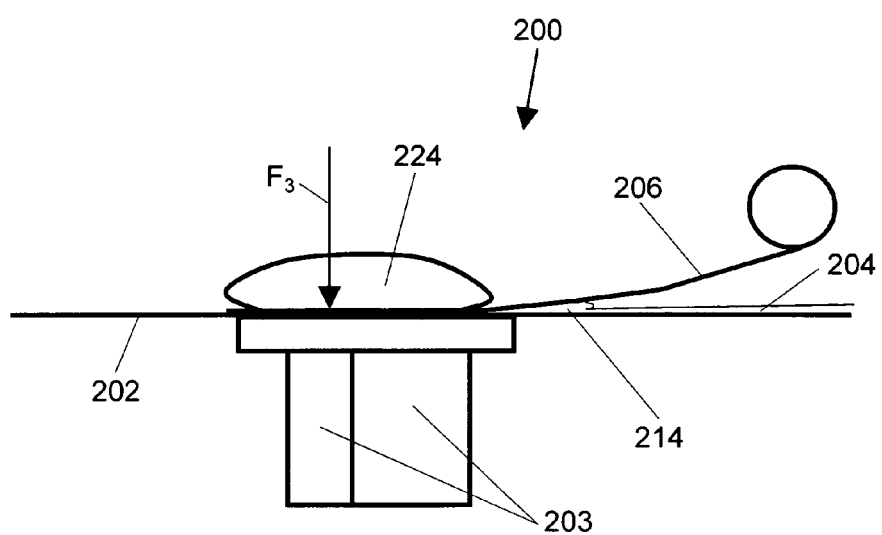
FIG. 11 is a schematic cross-sectional side view of an outer edge of transducer system and guiding member including a load member of the present invention.

FIG. 11 shows the system 200 with a large weight 224 that is placed on the outer side ends of the width of the moving member 202 so that the guide member 206 rests on the member 202 and nearly no medium may pass therebetween so that the medium is forced to pass on the inside of the weight 224 and below the guide member 206. In other words, the medium 204 may be forced to flow inwardly around the weight 224. This prevents any undesirable cross-flow or transverse flow of the medium out from the member 202. The weight 224 exerts a pressure F3 that is greater than the pressures F2 and F1.

Figure 12:
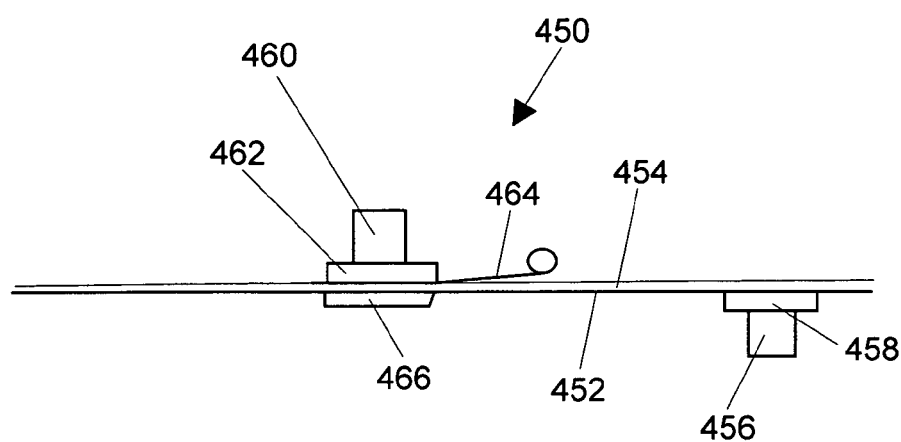
FIG. 12 is a schematic cross-sectional side view of a transducer system of the present invention with the transducer above the endless member.

FIG. 12 is a cross-sectional side view of a system 450 that has an endless wire or member 452 carrying a stock medium 454. An upstream transducer 456 with a foil 458 is disposed below the wire 452 and a second downstream transducer 460 with a foil 462 is positioned above the wire 452. A guide member 464 is connected to the foil 462 and a reflector 466 is aligned with the foil 462. The reflector 466 is preferably positioned immediately below and bears against the wire 452. In this way, the free fibers in the upper part of the stock medium 454 are substantially affected by the vibrations from the transducer 460 and the foil 462 without destroying the fiber network that has previously been formed on the wire 452. The reflector 466 prevents fillers and fine fibers from being washed out as a result of the downwardly directed ultrasound from the transducer 460 and the foil 462 associated therewith. The reflector 466 prevents some or most the water from flowing downwardly and some of the ultrasound is reflected off the transducer 460. One advantage of using a transducer that is placed above the stock medium is that the initial fiber structure that has been formed close to the wire is less likely to be destroyed by the ultrasound that comes in a downward direction from the surface of the stock medium.

Figure 13:
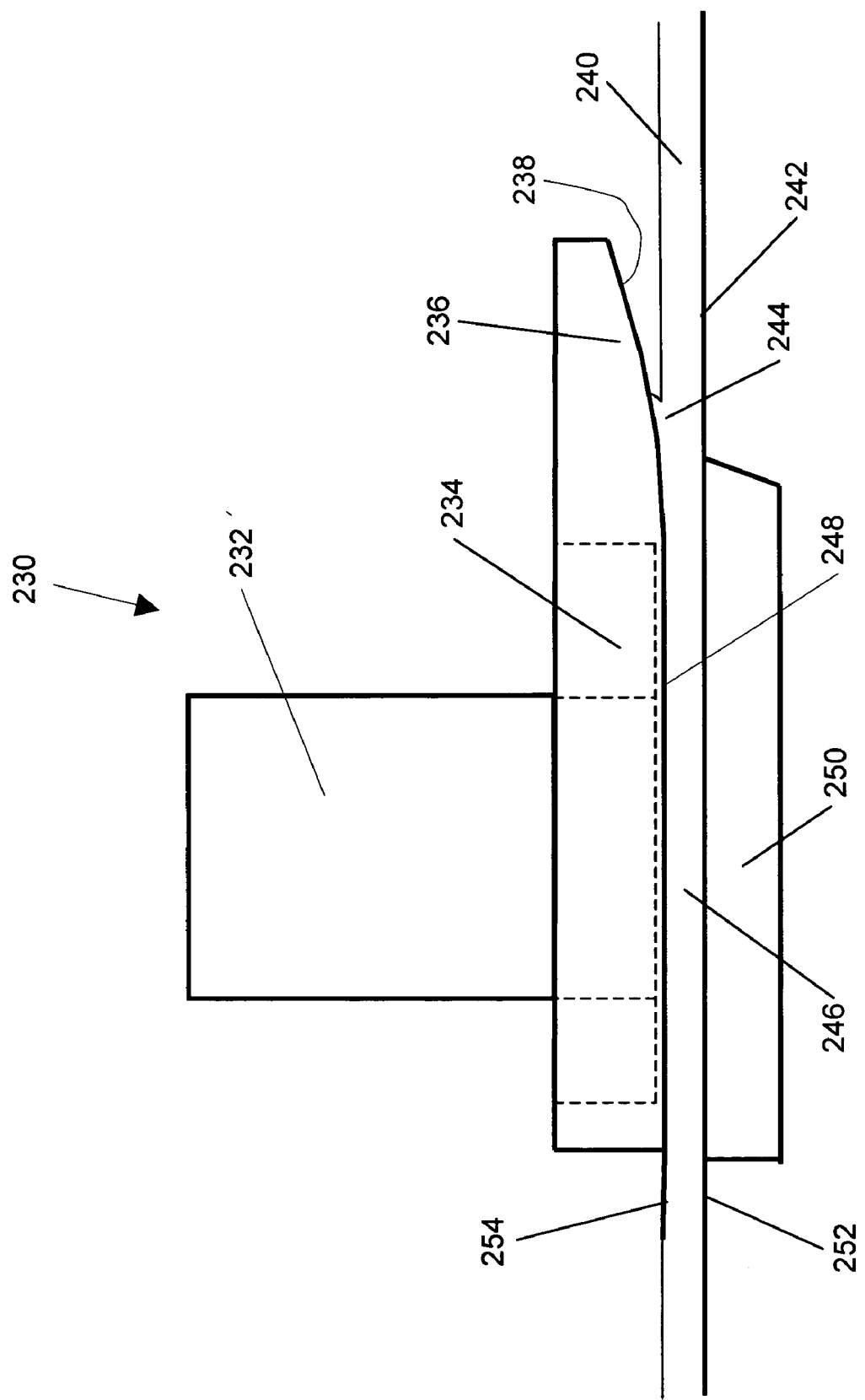
FIG. 13 is a schematic cross-sectional side view of the transducer system with a guide member integrated with the transducer system of the present invention.

FIG. 13 is a cross-sectional side view of a system 230 with a transducer unit 232 that is associated with a transverse foil element 234 that has an integrated guide member 236 with a curved or sloping bottom surface 238. The surface 238 bears against the stock medium 240 disposed on the endless member 242. A retardation zone 244 is formed behind the surface 238 and an acceleration zone 246 below the bottom surface 248, as described in detail above. Below the member or wire 242 is a lower foil 250 disposed that bears against a bottom surface 252 of the member 242. The foil 250 prevents the washing out of fine fiber fractions and fillers. The flexible member 254 prevents too much turbulence from occurring in the top part of the stock medium 240 when it leaves the acceleration zone 246.

Figure 14:
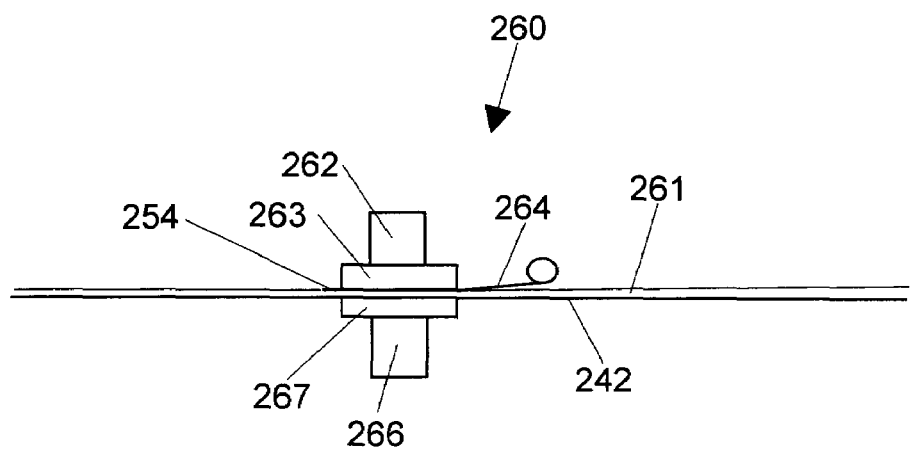
FIG. 14 is a schematic cross-sectional side view of a double-sided transducer system of the present invention.

FIG. 14 shows a double-sided transducer system 260 that has an upper transducer 262 and foil 263 associated with an upstream guide member 264. A lower transducer 266 and foil 267 are disposed below the endless member or wire 242 and are preferably aligned with the upper transducer 262. The system 260 provide such strong ultrasound that it completely fluidizes the stock medium and may destroy any previously formed fiber structure that may exist so that new fiber structures may be formed on the wire downstream of the system 260. Because most of the forming is done on the wire 242, the head-box may be reduced to function merely as a transverse and lengthwise manifold to distribute the stock medium 261. The flexible member 254 prevents too much turbulence from occurring in the top part of the stock medium 261.

Figure 15:
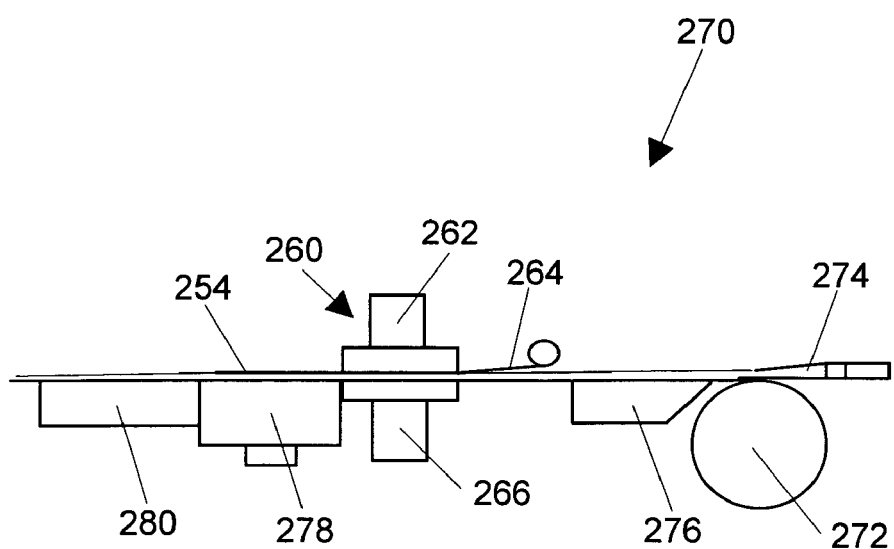
FIG. 15 is a schematic cross-sectional side view of the double-sided transducer system associated with a wire arrangement and suction boxes of the present invention.

FIG. 15 shows an example of the double-sided transducer system 260 used in a papermaking system 270 that includes a breast roll 272 below a head-box 274 and next to a forming board 276 that is upstream of the transducer system 260. A wet suction box 278 and a dry suction box 280 may be disposed downstream of the transducer system 260. Over the box 280 it is usually possible to see a dry line that indicates that air is sucked through the medium on the wire.

Figure 16:
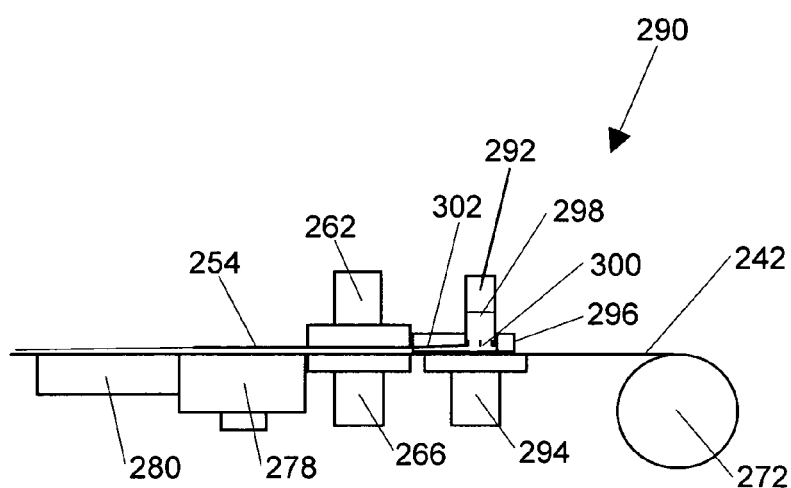
FIG. 16 is a schematic cross-sectional side view of the double-sided transducer system in a plane wire arrangement of the present invention.

FIG. 16 shows a plane wire system 290 that is suitable for high concentration stock medium 292 that may have a fiber concentration as high as 3–4% or higher. This means the amount of water required is reduced to 1/16 compared to the amount of water required when the concentration is 0.25%. This creates substantial savings in pumping energy. The stock medium 292 is pumped into a manifold 298 and further through a defusor 300 and out on a member or wire 242. The system 290 has a breast roll 272 for the member or wire 242. An upstream sealing frame 296 is disposed behind and at each side of the defusor 300. The system 290 has the upper transducer 262, the lower transducer 266 and a second lower transducer 294. A plastic foil 302 is disposed upstream of the transducer 262. The upper and lower transducers 262, 266 together with the transducer 294 may be used to completely fluidize the stock medium although the medium has a very high concentration such as 3–4%.

Figure 17:
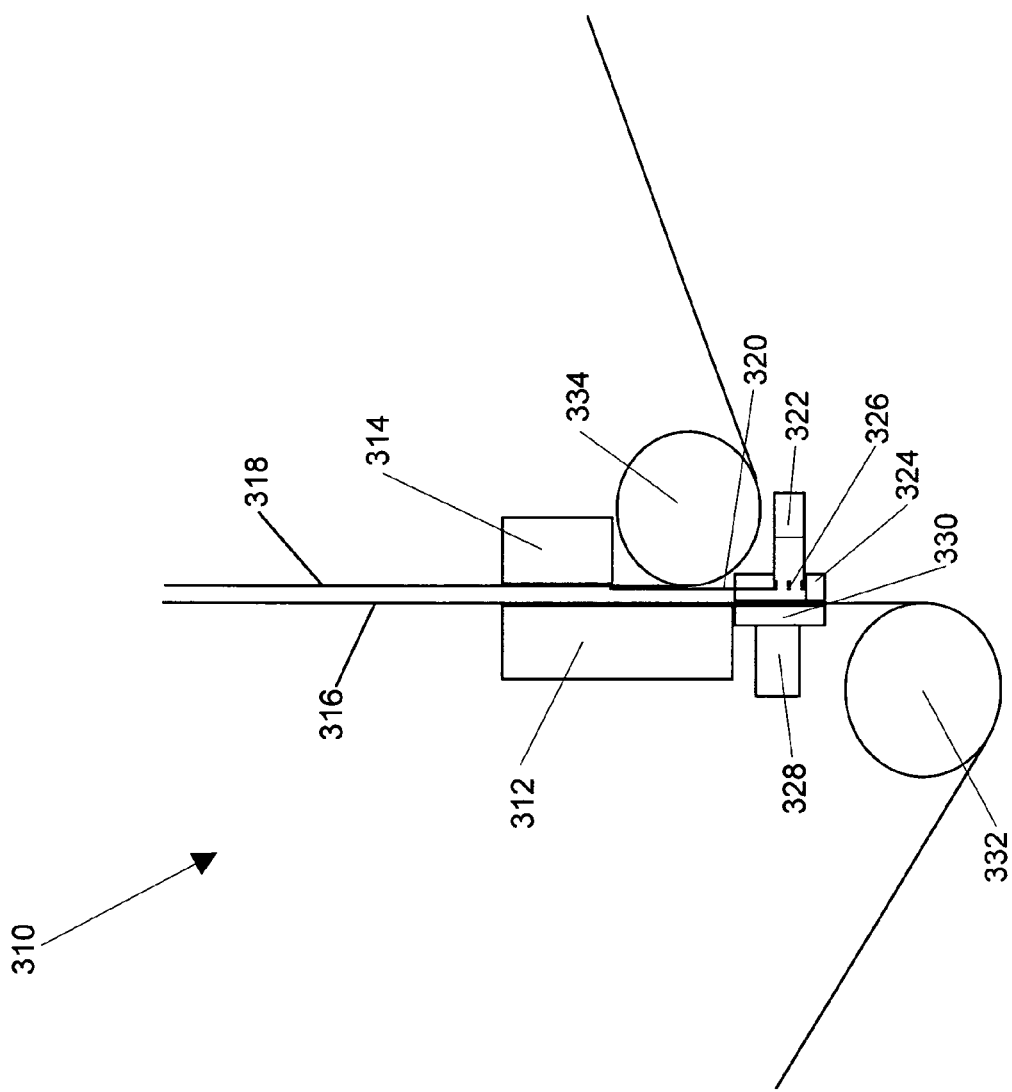
FIG. 17 is a schematic cross-sectional side view of the double-side transducer systems associated with a double wire arrangement of the present invention.

FIG. 17 is a double wire system 310 that has suction boxes 312, 314 on the outside of endless members or wires 316, 318, respectively. The system also has a plastic foil 320, a manifold 322, a sealing frame 324 and a defusor 326. A transducer 328 is positioned on the other side of the wires. A breast roll 332 carries the wire 316 and another breast roll 334 carries the wire 318.

Figure 18:
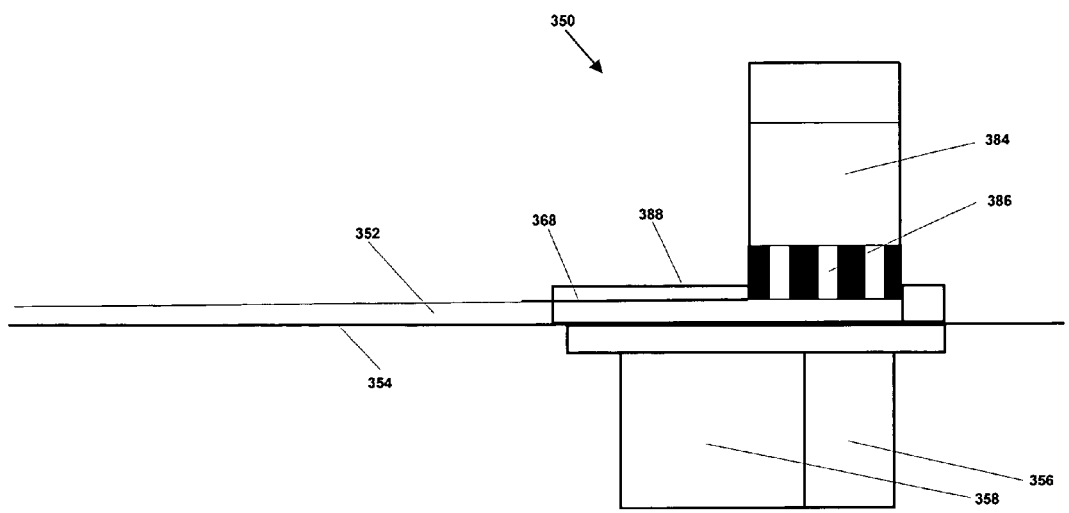
FIG. 18 is a schematic cross-sectional side view of a wire arrangement of the present invention for high consistency forming of low weight paper direct on the wire.

FIG. 18 is a side view of a system 350 for forming with high stock concentrations. The system 350 is particularly suitable for paper with a low grammage. The stock medium 352 comes from a manifold 384 through a defusor 386 and out on an endless wire or meter 354. Transducer units 356, 358 connected to a foil are disposed below the wire 354. The manifold with the defusor 386 is in operative engagement with a sealing frame 388 that is immediately adjacent the wire 354. A plastic member 368 is connected to the defusor 386.

Figure 19:
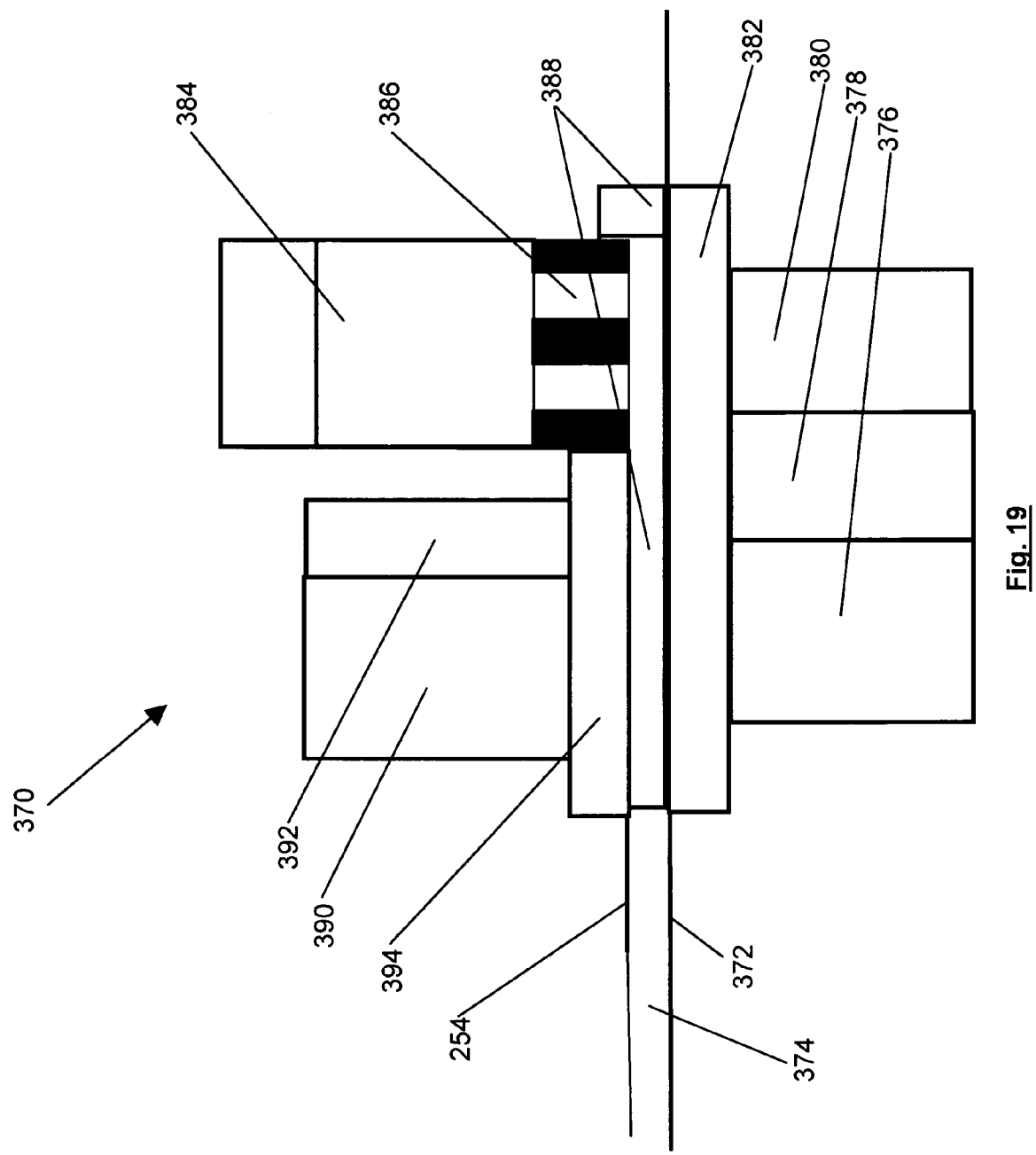
FIG. 19 is a schematic cross-sectional side view of a wire arrangement of the present invention for high consistency forming of high weight paper direct on the wire.

FIG. 19 is a side view of a system 370 for forming with high stock concentrations. The system 370 is particularly suitable for paper with a high grammage. The stock medium 374 comes from a manifold 384 through a defusor 386 and out on an endless wire or member 372. The system has transducer units 376, 378, 380 below the wire and a foil 382. The system further has a sealing frame 388. Transducer units 390, 392 with a foil 394 may be disposed above the wire 372. The flexible member 254 will prevent too much turbulence to occur in the top part of the stock medium 374 when it leaves the foil 394.

Figure 20:
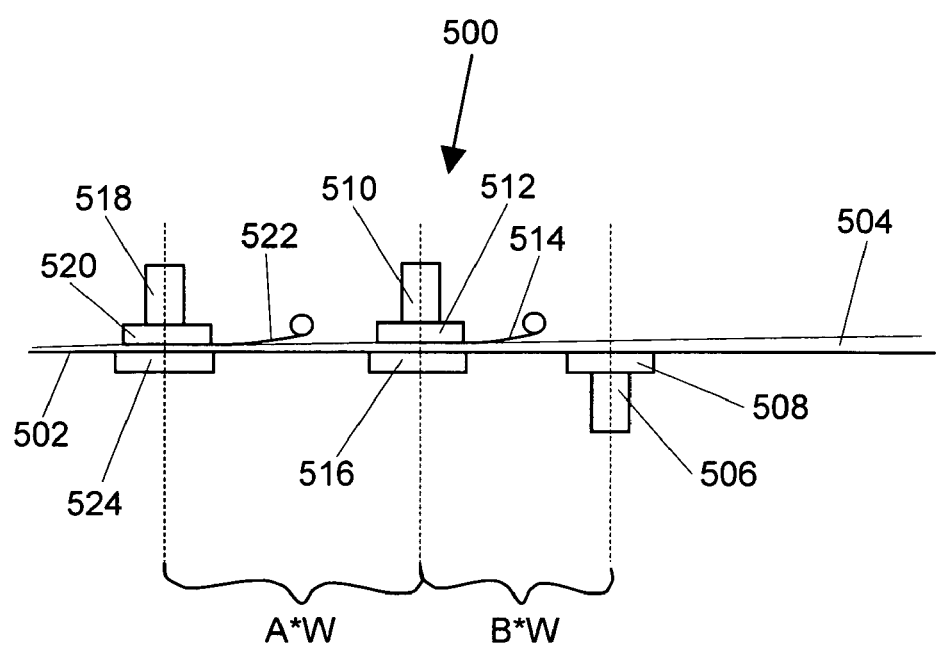
FIG. 20 is a schematic cross-sectional side view of the present invention with three transducers placed at integer multiple wavelength distances from each other.

FIG. 20 is a cross-sectional side view of a system 500 that has an endless wire or member 502 carrying a stock medium 504. An upstream transducer 506 with a foil 508 is disposed below the wire 502. A second downstream transducer 510 with a foil 512 is positioned above the wire 502. A guide member 514 is connected to the foil 512 and a reflector 516 is aligned with the foil 512. A third downstream transducer 518 with a foil 520 is positioned above the wire 502. A guide member 522 is connected to the foil 520 and a reflector 524 is aligned with the foil 520. When more than one transducer is used, as in this set up, it is possible to synchronize the transducers and place them at a distance from one another that is an integer multiple, A or B, of the wave length, W, of sound in water, which may be about 75 millimeters with a speed of sound in water of about 1500 meters per second at an ultrasound frequency of 20 kHz, to control the amplification of the ultrasound fields. By placing the transducers at the correct distance from one another, one transducer may enforce the ultrasound energy produced by another transducer.

While the present invention has been described in accordance with preferred compositions and embodiments, it is to be understood that certain substitutions and alterations may be made thereto without departing from the spirit and scope of the following claims.

We claim:

1. A method of treating a liquid or slurry with an ultrasonic energy comprising:
   providing a first member being permeable to a medium, and a first vibrating device, the first vibrating device and the first member having a first gap formed therebetween, the first gap representing a first distance;
   providing a guide member aligned with the first member, the medium moving relative to the guide member and the guide member forming a retardation zone and an acceleration zone in the medium as the medium flows under the guide member;
   the guide member breaking up fiber flocculation at an upper part of the medium and exerting a pressure on the medium; feeding the medium between the first member and the guide member;
   the first vibrating device generating pulses through the first member to form imploding bubbles in the medium, the bubbles having a critical diameter prior to implosion that is greater than the first distance to prevent the bubbles from being disposed in the first gap; and
   the bubbles imploding to break up fiber flocculation in a lower part of the medium close to the first member.

2. The method according to claim 1 wherein the method further comprises rotating the member and placing the first vibrating device below The member.

3. The method according to claim 2 wherein the method further comprises placing the guide member upstream of the vibrating device to break up fiber flocculation in the medium.

4. The method according to claim 2 wherein the method further comprises adding an additional weight on to the guide member.

5. The method according to claim 1 wherein the method further comprises the guide member applying a downward force on the medium to form the acceleration zone below the guide member.

6. The method according to claim 5 wherein the method further comprises forming the retardation zone upstream of the guide member.

7. The method according to claim 1 wherein the method further comprises adding a second vibrating device above the medium.

8. The method according to claim 7 wherein the method further comprises synchronizing the first and second vibrating devices to fluidize the medium.

9. The method according to claim 1 wherein the method further comprises creating the retardation zone immediately downstream of an outer end of the guide member.

10. A method of treating a liquid or slurry with an ultrasonic energy comprising:
    providing a first member being permeable to a medium, and a first vibrating device, the first vibrating device and the first member having a first gap formed therebetween, the first gap representing a first distance;
    providing a guide member aligned with the first member and exerting a pressure on the medium to break up fiber flocculation in the medium;
    feeding the medium between the first member and the guide member;
    the first vibrating device generating pulses through the first member to form imploding bubbles in the medium, the bubbles having a critical diameter prior to implosion that is greater than the first distance to prevent the bubbles from being disposed in the first gap; and adding an additional weight so that the guide member comes into contact with the first member so that no medium is passable between the guide member and the rotating member; and the medium passing around the additional weight.

11. A method of treating a liquid or slurry with an ultrasonic energy comprising:

providing a first member being permeable to a medium, and a first vibrating device, the first vibrating device and the first member having a first gap formed therebetween, the first gap representing a first distance;

providing a guide member aligned with the first member and exerting a pressure on the medium to break up fiber flocculation in the medium;

feeding the medium between the first member and the guide member;

the first vibrating device generating pulses through the first member to form imploding bubbles in the medium, the bubbles having a critical diameter prior to Implosion that is greater than the first distance to prevent the bubbles from being disposed in the first gap; and adding a second vibrating device, synchronizing the first and second vibrating devices and placing the first vibrating device at a distance from the second vibrating device that is an integer multiple of a wavelength of ultrasound in the fluid medium, to amplify ultrasonic fields.

* * * * *